(12) United States Patent
Jeong et al.

(10) Patent No.: US 11,042,252 B2
(45) Date of Patent: Jun. 22, 2021

(54) DISPLAY DEVICE

(71) Applicant: Samsung Display Co., Ltd., Yongin-si (KR)

(72) Inventors: Ye Ri Jeong, Yongin-si (KR); Dong Jin Moon, Yongin-si (KR); Tae Yong Eom, Yongin-si (KR); In Young Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/699,886

(22) Filed: Dec. 2, 2019

(65) Prior Publication Data

US 2020/0301544 A1 Sep. 24, 2020

(30) Foreign Application Priority Data

Mar. 21, 2019 (KR) .......................... 10-2019-0032512

(51) Int. Cl.
*G06F 3/044* (2006.01)
*G06F 1/16* (2006.01)

(52) U.S. Cl.
CPC .......... *G06F 3/0445* (2019.05); *G06F 1/1601* (2013.01); *G06F 3/0446* (2019.05)

(58) Field of Classification Search
CPC .... G06F 3/0445; G06F 3/0446; G06F 1/1601; G06F 3/04164; G06F 3/0443
See application file for complete search history.

(56) References Cited

U.S. PATENT DOCUMENTS

| | | |
|---|---|---|
| 2014/0368755 A1 | 12/2014 | Chen et al. |
| 2017/0219895 A1 | 8/2017 | Yu et al. |
| 2017/0249039 A1* | 8/2017 | Kim ................. G06F 3/0443 |
| 2017/0322446 A1* | 11/2017 | Tae ................. G02F 1/134309 |
| 2018/0026080 A1 | 1/2018 | Lee et al. |
| 2018/0067599 A1* | 3/2018 | Cai ................. G06F 3/0448 |
| 2018/0184531 A1 | 6/2018 | Seo et al. |
| 2018/0240850 A1* | 8/2018 | Chen ................. G06F 3/0446 |

FOREIGN PATENT DOCUMENTS

| | | |
|---|---|---|
| KR | 10-2017-0051784 | 5/2017 |
| KR | 10-2017-0076947 | 7/2017 |
| KR | 10-2018-0011914 | 7/2017 |
| KR | 10-1916306 | 11/2018 |

* cited by examiner

*Primary Examiner* — Premal R Patel
(74) *Attorney, Agent, or Firm* — H.C. Park & Associates, PLC

(57) ABSTRACT

A display device includes: a display panel including a display region including a rounded corner, the display region having a plurality of pixels arranged therein, and a non-display region surrounding the display region; a plurality of touch electrodes overlapping with the display region; and a first screen electrode disposed along the rounded corner to overlap with pixels disposed adjacent to the rounded corner among the plurality of pixels, the first screen electrode being electrically connected to some of the plurality of touch electrodes. Accordingly, the touch sensitivity of the touch electrodes can be improved, and pixels arranged in a stair step shape at the round corner of the display region can be prevented or reduced from being viewed from the outside.

16 Claims, 6 Drawing Sheets

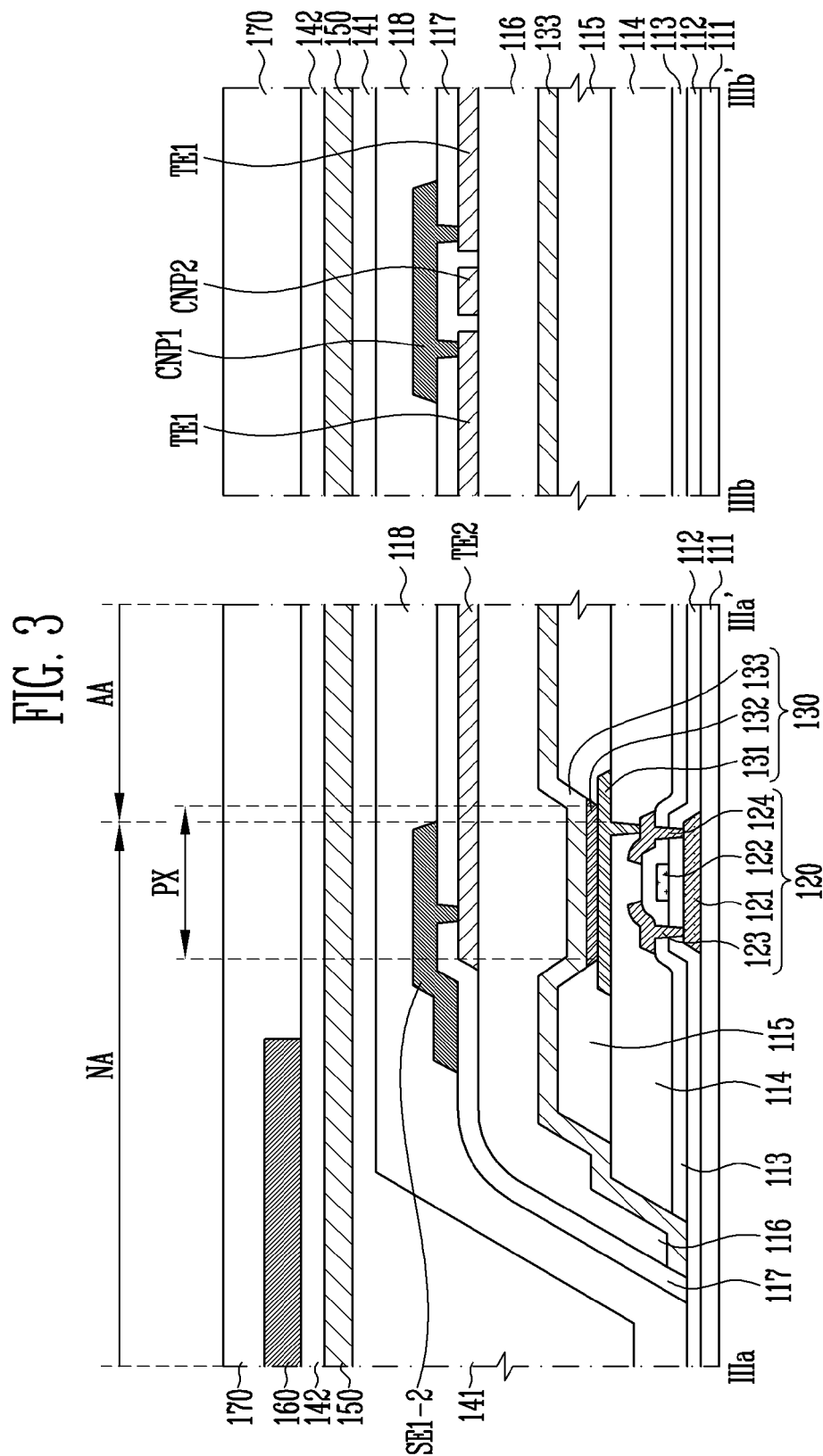

DISPLAY DEVICE

CROSS REFERENCE TO RELATED APPLICATION

This application claims priority from and the benefit of Korean Patent Application No. 10-2019-0032512, filed on Mar. 21, 2019, which is hereby incorporated by reference for all purposes as if fully set forth herein.

BACKGROUND

Field

Exemplary embodiments/implementations of the invention relate generally to a display device.

Discussion of the Background

With the development of information technologies, the importance of a display device which is a connection medium between a user and information increases. Accordingly, display devices such as a liquid crystal display device, an organic light emitting display device, and a plasma display device are increasingly used.

A display device may include a display panel configured to display an image, and the display panel may include a display region in which a plurality of pixels are defined. A corner of the display region may be a curved corner having a rounded shape, and a plurality of pixels may be arranged in a stair step shape at such a rounded corner.

Also, the display device may include a touch panel configured to sense a touch on a surface thereof, and the touch panel may include a plurality of touch electrodes. A capacitance between the plurality of touch electrodes may be changed by a contact on the surface of the display device, and a touch may be sensed by the change in capacitance.

The above information disclosed in this Background section is only for understanding of the background of the inventive concepts, and, therefore, it may contain information that does not constitute prior art.

SUMMARY

Embodiments provide a display device in which a screen electrode for preventing pixels arranged in a stair step shape from being viewed from the outside is disposed at a rounded corner of a display region, and is electrically connected to an adjacent touch electrode, so that the touch sensitivity of the touch electrode can be improved, and the area of a region capable of recognizing a touch can be increased by using the screen electrode as a touch electrode.

Embodiments also provide a display device in which a screen electrode for preventing adjacent pixels from being viewed from the outside is further disposed at a linear edge of a display region except a rounded corner, and is patterned corresponding to each of touch electrodes overlapping with the screen electrode to be electrically connected to the touch electrode, so that the touch sensitivity of the touch electrode can be improved, and the area of a region capable of recognizing a touch can be increased by using the screen electrode disposed at the edge as a touch electrode.

Embodiments also provide a display device in which touch lines connecting touch electrodes and touch pads extend onto pixels arranged in a stair step shape at a rounded corner of a display region to screen the pixels arranged in the stair step shape, so that the pixels arranged in the stair step shape at the rounded corner can be prevented from being viewed from the outside, and the area of a non-display region of the display device can be decreased.

Additional features of the inventive concepts will be set forth in the description which follows, and in part will be apparent from the description, or may be learned by practice of the inventive concepts.

One or more exemplary embodiments of the inventive concepts provide a display device including: a display panel including a display region including a rounded corner, the display region having a plurality of pixels arranged therein, and a non-display region surrounding the display region; a plurality of touch electrodes overlapping with the display region, the plurality of touch electrodes including a plurality of first touch electrodes that are disposed in a first direction and are electrically connected to each other and a plurality of second touch electrodes that are disposed in a second direction perpendicular to the first direction and are electrically connected to each other; and a first screen electrode disposed along the rounded corner to overlap with pixels disposed adjacent to the rounded corner among the plurality of pixels, the first screen electrode being electrically connected to some of the plurality of touch electrodes.

Pixels disposed adjacent to the rounded corner may be arranged in a stair step shape. The first screen electrode may overlap with the pixels arranged in the stair step shape.

The first screen electrode may include: a first one of the first screen electrode electrically connected to a first touch electrode adjacent to the rounded corner among the plurality of first touch electrodes; and a second one of the first screen electrode electrically connected to a second touch electrode adjacent to the rounded corner among the plurality of second touch electrodes.

The first screen electrode may overlap with touch electrodes adjacent to the rounded corner with an insulating layer interposed therebetween, and be electrically connected to the touch electrodes adjacent to the rounded corner through a contact hole formed in the insulating layer.

The display device may further include a second screen electrode disposed along an edge of the display region, the second screen electrode overlapping with pixels disposed at an outer portion adjacent to the edge among the plurality of pixels, the second screen electrode being electrically connected to some of the plurality of touch electrodes.

The second screen electrode may include: a first one of the second screen electrode electrically connected to a first touch electrode adjacent to the edge among the plurality of first touch electrodes; and a second one of the second screen electrode electrically connected to a second touch electrode adjacent to the edge among the plurality of second touch electrodes.

The second screen electrode may overlap with touch electrodes adjacent to the edge with an insulating layer interposed therebetween, and be electrically connected to the touch electrodes adjacent to the edge through a contact hole formed in the insulating layer.

The second screen electrode may be made of the same material as the first screen electrode.

The display device may further include a plurality of touch lines disposed in the non-display region along an outer portion of the display region, the plurality of touch lines being respectively connected to the plurality of touch electrodes.

The first screen electrode may be disposed between the plurality of touch lines and the rounded corner of the display region.

The first screen electrode may be made of the same material as the plurality of touch lines.

The plurality of touch lines may be disposed to extend to the display region along the rounded corner, and overlap with pixels disposed at an outer portion adjacent to the rounded corner among the plurality of pixels.

The distance between the plurality of touch lines disposed in the display region while being adjacent to the rounded corner may be 5 µm or less.

The plurality of touch lines may be disposed to extend to the display region along the edge of the display region, and overlap with pixels disposed at an outer portion adjacent to the edge among the plurality of pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 3 is a sectional view taken along line IIIa-IIIa' shown in FIG. 1 and line IIIb-IIIb' shown in FIG. 2B.

DETAILED DESCRIPTION

Figure 1:
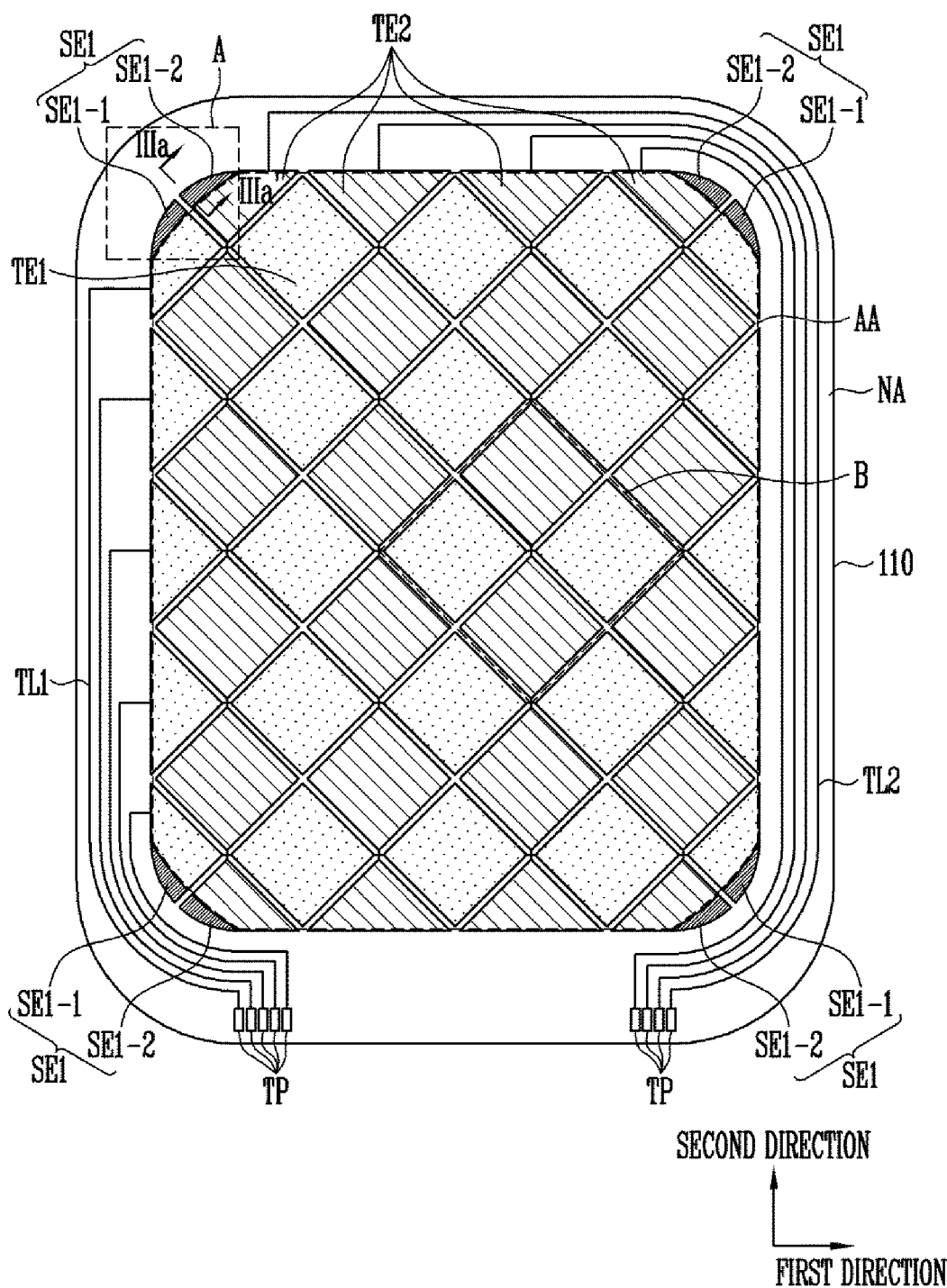
FIG. 1 is a plan view of a display device in accordance with an exemplary embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concepts will be described in more detail with reference to the accompanying drawings.

Figure 2A:
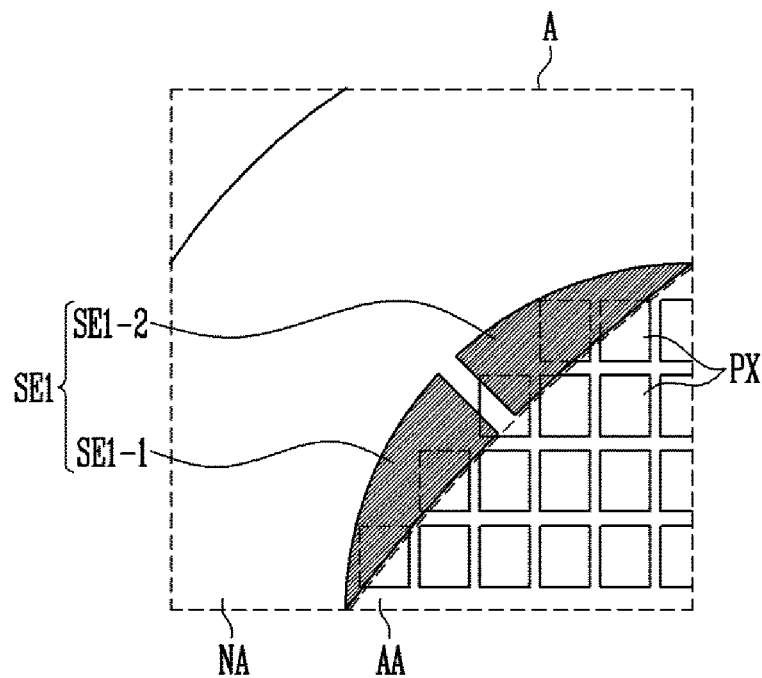
FIG. 2A is an enlarged plan view of region A shown in FIG. 1.
Figure 2B:
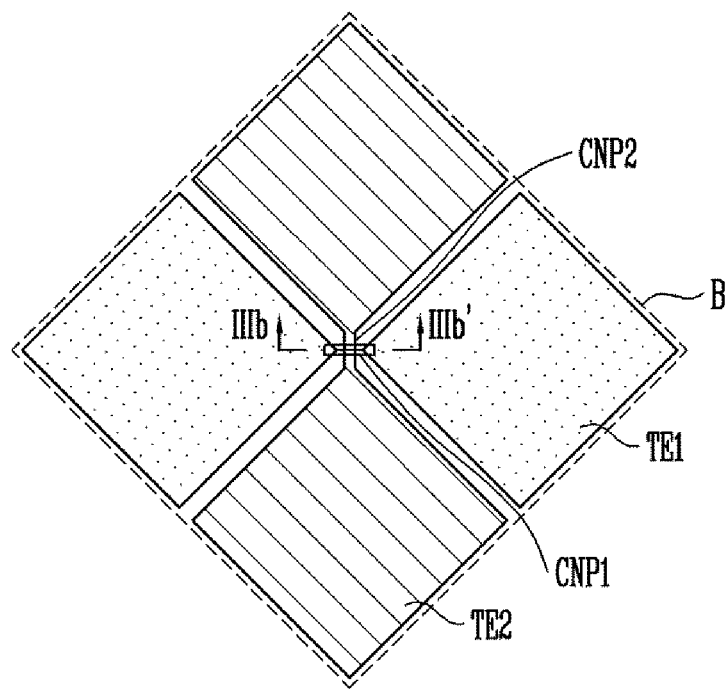
FIG. 2B is an enlarged plan view of region B shown in FIG. 1.

FIG. 1 is a plan view of a display device in accordance with an embodiment of the inventive concepts. FIG. 2A is an enlarged plan view of region A shown in FIG. 1. FIG. 2B is an enlarged plan view of region B shown in FIG. 1. FIG. 3 is a sectional view taken along line IIIa-IIIa' shown in FIG. 1 and line IIIb-IIIb' shown in FIG. 2B. In the plan view shown in FIG. 2A, a plurality of touch electrodes TE1 and TE2 will be omitted.

Referring to FIG. 1, FIG. 2, and FIG. 3, the display device 100 includes a display panel 110, a plurality of touch electrodes TE1 and TE2, a plurality of touch lines TL1 and TL2, a plurality of touch pads TP, and a plurality of first screen electrodes SE1.

The display panel 110 is a component configured to display an image, and may include a display region AA and a non-display region NA. The display region AA is a region in which the image is displayed, and may include rounded corners. For example, four corners of the display region AA may have a curved shape instead of a square shape, but the inventive concepts are not limited thereto. That is, only some of the four corners of the display region AA may be rounded corners, and the other corners may be square corners.

A plurality of pixels PX may be defined in the display region AA. Although each of the plurality of pixels PX is not shown, the pixel PX may be connected to a data line, a scan line, and an emission line to output an image in response to a data signal, a scan signal, and an emission signal. As shown in FIG. 2A, a plurality of pixels PX arranged in the display region AA may be arranged in a stair step shape while being adjacent to a rounded corner. A plurality of pixels PX adjacent to a rounded corner of the display region AA may be arranged in a stair step shape such that the pixels PX are arranged as many as possible at the rounded corner.

As shown in FIG. 3, each of the pixels PX may include a transistor 120 and an organic light emitting diode 130.

Specifically, a substrate 111 is a component configured to support various components of the display device 100. The substrate 111 may be made of, for example, plastic such as polyimide, but the inventive concepts are not limited thereto.

The transistor 120 is disposed on the substrate 111. Specifically, an active layer 121 of the transistor 120 is disposed on the substrate 111. The active layer 121 may be made of silicon, an oxide semiconductor, an organic semiconductor, or the like, but the inventive concepts are not limited thereto. The active layer 121 includes a channel region in which a channel is formed, a source region connected to a source electrode 123, and a drain region connected to a drain electrode 124.

A gate insulating layer 112 is formed over the active layer 121. The gate insulating layer 112 may be made of an inorganic material including silicon oxide, silicon nitride, and/or silicon oxynitride, and insulate the active layer 121 and a gate electrode 122 from each other.

The gate electrode 122 is disposed on the gate insulating layer 112. The gate electrode 122 may be a single layer or multi-layer made of a conductive material including molybdenum (Mo), aluminum (Al), copper (Cu), and/or titanium Ti.

An interlayer insulating layer 113 is formed over the gate electrode 122. The interlayer insulating layer 113 may be made of an inorganic material such as silicon nitride (SiNx) or silicon oxide (SiOx), and be provided in a single layer or a multi-layer including the same. However, the inventive concepts are not limited thereto.

The source electrode 123 and the drain electrode 124 of the transistor 120 are formed on the interlayer insulating layer 113. Each of the source electrode 123 and the drain electrode 124 is electrically connected to the active layer 121 through a contact hole formed in the gate insulating layer 112 and the interlayer insulating layer 113. The source electrode 123 and the drain electrode 124 may be made of a conductive material, and be formed of the same material through the same process. The inventive concepts are not limited thereto.

A planarization layer 114 is disposed over the source electrode 123 and the drain electrode 124. The planarization layer 114 is a layer for planarizing the top of the transistor 120, and be provided in a single layer as shown in FIG. 3. Alternatively, the planarization layer 114 may be provided in a multi-layer. The planarization layer 114 may be made of acryl-based organic material, but the inventive concepts are not limited thereto.

The organic light emitting diode 130 is disposed on the planarization layer 114. The organic light emitting diode 130 includes an anode 131 electrically connected to the drain electrode 124 of the transistor 120, an organic layer 132 disposed on the anode 131, and a cathode 133 formed on the organic layer 132. When the display device 100 is a top emission type organic light emitting display device, the anode 131 may further include a reflective layer for reflecting light emitted from the organic light emitting diode 130 toward the cathode 133 and a transparent conductive layer for supplying holes to the organic layer 132. Although a case where the organic layer 132 is patterned for each pixel PX to emit light of a specific color such as green, blue or red is illustrated in FIG. 3, the inventive concepts are not limited thereto, and the organic layer 132 may be formed throughout the entire display region AA.

A pixel defining layer 115 is disposed on the anode 131 and the planarization layer 114. The pixel defining layer 115 is a structure for distinguishing adjacent pixels PX in the display region AA, and may define a plurality of pixels PX. The pixel defining layer 115 may be made of an organic material. Also, the pixel defining layer 115 may expose at least a portion of the anode 131. For example, the pixel defining layer 115 may cover an edge of the anode 131, and expose the other region.

An encapsulation layer 116 is disposed over the organic light emitting diode 130. The encapsulation layer 116 may cover the organic light emitting diode 130 to protect the organic light emitting diode 130. The encapsulation layer 116 may extend up to an outer portion of the display region AA. The encapsulation layer 116 may be provided in a single layer as shown in FIG. 3, but the inventive concepts are not limited thereto. For example, the encapsulation layer 116 may have a multi-layered structure in which an inorganic encapsulation layer, an organic encapsulation layer, and an inorganic encapsulation layer are sequentially stacked.

A plurality of touch electrodes TE1 and TE2 may be disposed on the encapsulation layer 116. The plurality of touch electrodes TE1 and TE2 include a plurality of first touch electrodes TE1 and a plurality of second touch electrodes TE2.

The plurality of first touch electrodes TE1 are touch electrodes arranged in a first direction. The plurality of first touch electrodes TE1 are connected in the first direction through first connection electrodes CNP1. Although not shown in FIG. 3, the plurality of first touch electrodes TE1 may be formed on the encapsulation layer 116, and be provided as a transparent conductive layer. For example, the plurality of first touch electrodes TE1 may be made of Transparent Conductive Oxide (TCO), and be made of, for example, Indium Tin Oxide (ITO). Accordingly, although the plurality of first touch electrodes TE1 are disposed on the plurality of pixels PX, light emitted from the plurality of pixels PX can be viewed from the outside of the display device 100. However, alternatively, the plurality of touch electrodes TE1 and TE2 may be configured with a mesh pattern. The mesh pattern may have a shape in which metal lines intersect each other, and the metal lines may be made of a low-resistance metal material such as copper (Cu), aluminum (Al), molybdenum (Mo), titanium (Ti), silver (Ag), gold (Au), nickel (Ni), or chrome (Cr).

As shown in FIG. 2B, first connection electrodes CNP1 may be disposed between adjacent first touch electrodes TE1. The first connection electrodes CNP1 may connect the first touch electrodes TE1. The first connection electrodes CNP1 may be disposed on a touch insulating layer 117 disposed over the plurality of first touch electrodes TE1, and connect the plurality of first touch electrodes TE1 to each other through contact holes formed in the touch insulating layer 117.

The plurality of second touch electrodes TE2 are touch electrodes arranged in a second direction perpendicular to the first direction. The plurality of second touch electrodes TE2 and the plurality of first touch electrodes TE1 are alternately disposed in a grid shape along the first direction and the second direction. The plurality of second touch electrodes TE2 may be made of the same material as the plurality of first touch electrodes TE1. For example, the plurality of second touch electrodes TE2 may be made of TCO, and be made of, for example, ITO. Alternatively, the plurality of second touch electrodes TE2 may be configured with a mesh pattern having a shape in which metal lines intersect each other.

Second connection electrodes CNP2 are disposed between adjacent second touch electrodes TE2. The second connection electrodes CNP2 may connect the second touch electrodes TE2. The second connection electrodes CNP2 may be simultaneously formed of the same material on the same layer as the plurality of second touch electrodes TE2. Accordingly, both the second touch electrodes TE2 and the second connection electrodes CNP2 can be disposed on the encapsulation layer 116.

The second connection electrodes CNP2 may overlap with the first connection electrodes CNP1 while intersecting the first connection electrodes CNP1 with an insulating layer interposed therebetween. Specifically, as described above, the touch insulating layer 117 is disposed over the touch electrodes arranged on the encapsulation layer 116. Accordingly, the second connection electrodes CNP2 disposed on the encapsulation layer 116 and the first connection electrodes CNP1 disposed on the touch insulating layer 117 can overlap with each other while intersecting each other in the first direction and the second direction, and be insulated from each other by the touch insulating layer 117. The second connection electrodes CNP2 may be made of a metal material.

The connection electrodes of the second touch electrodes TE2 may be disposed on the bottom of the connection electrodes of the first touch electrodes TE1. However, the inventive concepts are not limited thereto, and the first touch electrodes TE1 may be connected to each other by the first connection electrodes CNP1 disposed on the same layer as the first touch electrodes TE1. The touch second touch electrodes TE2 may be connected to each other by the second connection electrodes CNP2 formed on the touch insulating layer 117.

The plurality of touch electrodes TE1 and TE2 may be formed to correspond to the entire display region AA. Touch electrodes TE1 and TE2 adjacent to a rounded corner of the display region AA may be formed to correspond to the rounded corner. For example, as shown in FIG. 1, a first touch electrode TE1 and a second touch electrode TE2, which are disposed adjacent to a rounded corner, may have a rounded shape.

The plurality of first screen electrodes SE1 are electrodes disposed in the non-display region NA along outer portions of the display region AA while being adjacent to the rounded corners of the display region AA. Specifically, the first screen electrodes SE1 may be formed in the shape of a curve along the rounded corners of the display region AA. As described above, pixels PX may be arranged in a stair step shape at a round corner of the display region AA, and the first screen electrode SE1 may be disposed to overlap with the stair step shape of the pixels PX. Accordingly, the pixels PX arranged in the stair step shape can be prevented or reduced from being viewed from the outside of the display device 100.

The first screen electrodes SE1 may be electrically connected to the plurality of touch electrodes TE1 and TE2.

Specifically, the first screen electrode SE1 may be electrically connected to touch electrodes TE1 and TE2 disposed adjacent to a rounded corner. As shown in FIG. 1, the first screen electrode SE1 disposed at the rounded corner of the display region AA may include a (1-1)th screen electrode SE1-1 connected to a first touch electrode TE1 and a (1-2)th screen electrode SE1-2 connected to a second touch electrode TE2. For example, as shown in FIG. 3, the (1-2)th screen electrode SE1-2 may be disposed on the touch insulating layer 117. The (1-2)th screen electrode SE1-2 may overlap with a touch electrode TE2 disposed on the bottom of the touch insulating layer 117, and be electrically connected to the second touch electrode TE2 through a contact hole formed in the touch insulating layer 117. Accordingly, the (1-2)th screen electrode SE1-2 overlaps with pixels PX disposed at an outer portion of the display region AA while being adjacent to a rounded corner of the display region AA, so that the pixels PX arrange in the stair step shape can be prevented or reduced from being viewed from the outside of the display device 100. Thus, the first screen electrodes SE1 are electrically connected to the respectively touch electrodes overlapping therewith. Accordingly, the first screen electrodes SE1 can prevent or reduce the pixels PX arranged in the stair step shape from being viewed, and serve as touch electrodes.

A cover layer 118 may be disposed on the first screen electrodes SE1 and the touch insulating layer 117. The cover layer 118 may be a layer for protecting components disposed on the bottom thereof on the first screen electrodes SE1 and the touch electrodes TE1 and TE2.

A first adhesive layer 141 may be disposed on the cover layer 118. The first adhesive layer 141 may be a layer for allowing components disposed on the top and bottom thereof to be adhered to each other. The first adhesive layer 141 may be made of an adhesive material. For example, the first adhesive layer 141 may be made of an Optical Clear Adhesive (OCA). However, the inventive concepts are not limited thereto.

A polarizing layer 150 may be disposed on the first adhesive layer 141. The polarizing layer 150 may polarize light emitted from the plurality of pixels PX.

A second adhesive layer 142 may be disposed on the polarizing layer 150. The second adhesive layer 142 may be a layer for allowing the polarizing layer 150 and a window member 170 to be adhered to each other. The second adhesive layer 142 may be made of the same adhesive material as the first adhesive layer 141. For example, the second adhesive layer 142 may be made of an OCA. However, the inventive concepts are not limited thereto.

A light shielding layer 160 is disposed on the second adhesive layer 142. The light shielding layer 160 may correspond to at least a portion of the non-display region NA of the display device 100, and prevent several components disposed in the non-display region NA from being viewed from the outside of the display device 100. The light shielding layer 160 may include a light shielding material.

The window member 170 is disposed on the second adhesive layer 142 and the light shielding layer 160. The window member 170 may be formed to correspond to both the display region AA and the non-display region NA, to protect the top of the display device 100. A user of the display device 100 may apply a touch input to an upper surface of the window member 170, and the display device 100 may recognize the touch input. The window member 170 may be in contact with an upper surface of the second adhesive layer 142, which does not overlap with the light shielding layer 160, an upper surface of the light shielding layer 160, and some of side surfaces of the light shielding layer 160.

The non-display region NA is a region surrounding the display region AA. Like the display region AA, the non-display region NA may include rounded corners. However, the inventive concepts are not limited thereto, and the corners of the non-display region NA may be right-angled corners instead of the rounded corners.

The plurality of touch lines TL1 and TL2 and the plurality of touch pads are disposed in the non-display region NA. The plurality of touch lines TL1 and TL2 are lines respectively connected to the plurality of touch electrodes TE1 and TE2. Specifically, the plurality of touch lines TL1 and TL2 may include a plurality of first touch lines TL1 respectively connected to the plurality of first touch electrodes TE1 and a plurality of second touch lines TL2 respectively connected to the plurality of touch electrodes TE2. The first touch lines TL1 and the second touch lines TL2 may extend along an edge of the display region AA to be connected to the plurality of touch pads TP. Also, the plurality of touch lines TL1 and TL2 may be made of the same material as the first screen electrodes SE1. That is, the touch lines TL1 and TL2 and the first screen electrodes SE1 may be formed of the same material on the touch insulating layer 117 through the same process.

The display device 100 in accordance with the embodiment of the inventive concepts includes the first screen electrodes SE1 disposed along the rounded corners. Pixels PX adjacent to a rounded corner may be arranged in a stair step shape, and the first screen electrode SE1 overlaps with the pixels PX arranged in the stair step shape, to prevent or reduce the stair step shape from being viewed from the outside.

In the display device 100 in accordance with the embodiment of the inventive concepts, the first screen electrode SE1 may be electrically connected to touch electrodes TE1 and TE2 adjacent thereto. When the first screen electrode SE1 is not connected to the touch electrodes TE1 and TE2 but is floated, charges may be accumulated in the first screen electrode SE1 due to various conductors disposed adjacent to the first screen electrode SE1. The accumulated charges may not be discharged. Therefore, the touch sensitivity of the touch electrodes TE1 and TE2 disposed adjacent to the first screen electrode SE1 may be lowered. However, the first screen electrode SE1 of the display device 100 in accordance with the embodiment of the inventive concepts can be electrically connected to the touch electrodes TE1 and TE2 overlapping therewith, and is not floated. Thus, the touch sensitivity of the touch electrodes TE1 and TE2 can be further improved. Also, the first screen electrode SE1 is electrically connected to the touch electrodes TE1 and TE2. Thus, the first screen electrode SE1 can perform the same function of the touch electrodes TE1 and TE2 connected thereto. Accordingly, the area of a region capable of sensing a touch can be further widened.

Meanwhile, in accordance with various embodiments of the inventive concepts, the first screen electrode SE1 may maximally extend in the direction of an outer portion of the display region AA. Specifically, the first screen electrode SE1 may be formed to maximally extend to the non-display region NA from the rounded corner of the display region AA. For example, the first screen electrode SE1 may be disposed to be maximally adjacent to touch lines TL1 and TL1 disposed immediately adjacent to the first screen electrode SE1 at the rounded corner of the display region AA. Accordingly, the area of the first screen electrode SE1 can be maximized. As described above, the first screen electrode SE1 is electrically connected to the touch electrodes TE1 and TE2, to serve as a touch electrode. Thus, when the area of the first screen electrode SE1 is further widened, the area of a region capable of sensing a touch can be further widened.

When the area of the first screen electrode SE1 is maximally expanded, and touch lines TL1 and TL2 are disposed immediately adjacent to the first screen electrode SE1, the distance between the touch lines TL1 and TL2 immediately adjacent to the first screen electrode SE1 may be 5 µm or more. When the distance between the touch lines TL1 and TL2 immediately adjacent to the first screen electrode SE1 is smaller than 5 µm, the first screen electrode SE1 is electrically connected to the touch electrodes TE1 and TE2, and therefore, electrical signals of the first screen electrode SE1 performing the same function as the touch electrodes TE1 and TE2 and the touch lines TL1 and TL2 may overlap with each other. Thus, when the area of the first screen electrode SE1 is maximally expanded as described above, the distance between the first screen electrode SE1 and the touch lines TL1 and TL2 is set to 5 µm or more, and signal overlapping between the touch electrodes TE1 and TE2 and the touch lines TL1 and TL2 can be prevented.

Figure 4:
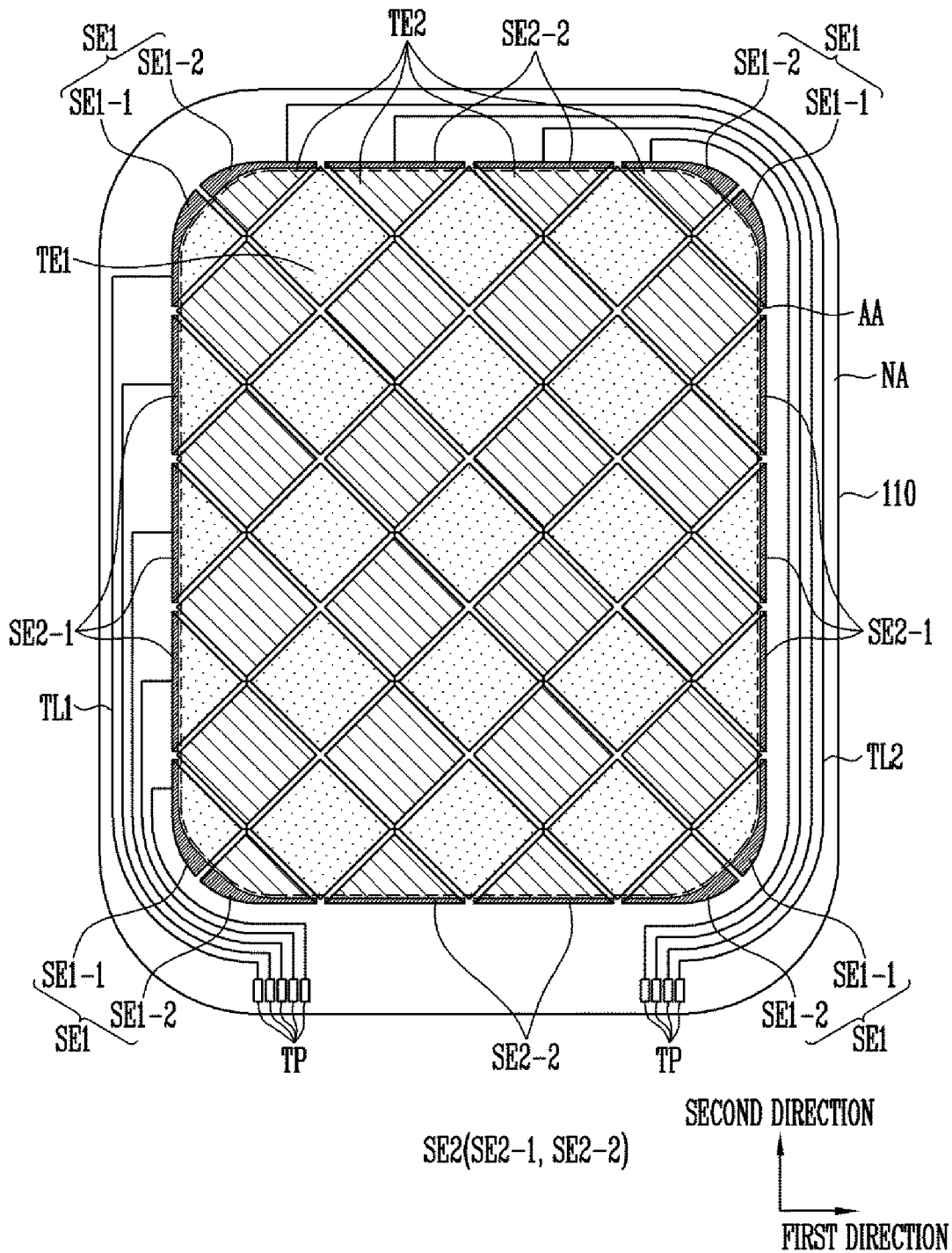
FIG. 4 is a plan view of a display device in accordance with another exemplary embodiment of the inventive concepts.

FIG. 4 is a plan view of a display device in accordance with another embodiment of the inventive concepts. The display device 200 shown in FIG. 4 is substantially identical to the display device 100 shown in FIG. 1, FIG. 2, and FIG. 3, except a plurality of second screen electrodes SE2, and therefore, overlapping descriptions will be omitted.

Referring to FIG. 4, the plurality of second screen electrodes SE2 are electrodes disposed along edges of the display region AA. Specifically, the second screen electrodes SE2 may be disposed to extend along four edges except the rounded corners of the display region AA, corresponding to the edges.

The plurality of second screen electrodes SE2 may include (2-1)th screen electrodes SE2-1 connected to first touch electrodes TE1 and (2-2)th screen electrodes SE2-2 connected to second touch electrodes TE2.

The (2-1)th screen electrodes SE2-1 may be disposed at edges adjacent to the first touch electrodes TE1 among the edges of the display region AA. The (2-1)th screen electrodes SE2-1 may be patterned to correspond to the first touch electrodes TE1 adjacent thereto. The (2-1)th screen electrodes SE2-1 may be formed on the same layer as the first screen electrodes SE1, i.e., on the touch insulating layer 117, and be electrically connected to the first touch electrodes TE1 through contact holes formed in the touch insulating layer 117. The (2-1)th screen electrodes SE2-1 may be made of the same material as the first screen electrodes SE1, and be formed through the same process as the first screen electrodes SE1. However, the inventive concepts are not limited thereto.

The (2-2)th screen electrodes SES2-2 may be disposed at edges adjacent to the second touch electrodes TE2 among the edges of the display region AA. The (2-2)th screen electrodes SE2-2 may be patterned to correspond to the second touch electrodes TE2 adjacent thereto. The (2-2)th screen electrodes SE2-2 may be formed on the same layer as the first screen electrodes SE1, i.e., on the touch insulating layer 117, and be electrically connected to the second touch electrodes TE2 through contact holes formed in the touch insulating layer 117. The (2-2)th screen electrodes SE2-2 may be made of the same material as the first screen electrodes SE1, and be formed through the same process as the first screen electrodes SE1. However, the inventive concepts are not limited thereto.

In the display device 200 in accordance with the another embodiment of the inventive concepts, the plurality of second screen electrodes SE2 are disposed to extend along the edges of the display region AA. The second screen electrodes SE2 are patterned to correspond to touch electrodes TE1 and TE2 adjacent thereto, and electrically connected to the adjacent touch electrodes TE1 and TE2. Thus, the second screen electrodes SE2 are not floated, and a voltage applied to the touch electrodes TE1 and TE2 electrically connected to the second screen electrodes can be applied to the second screen electrodes SE2. Accordingly, the touch sensitivity of the touch electrodes TE1 and TE2 can be further improved. In addition, the area of the touch electrodes TE1 and TE2 can be increased corresponding to the area of the second screen electrodes SE2.

Figure 5:
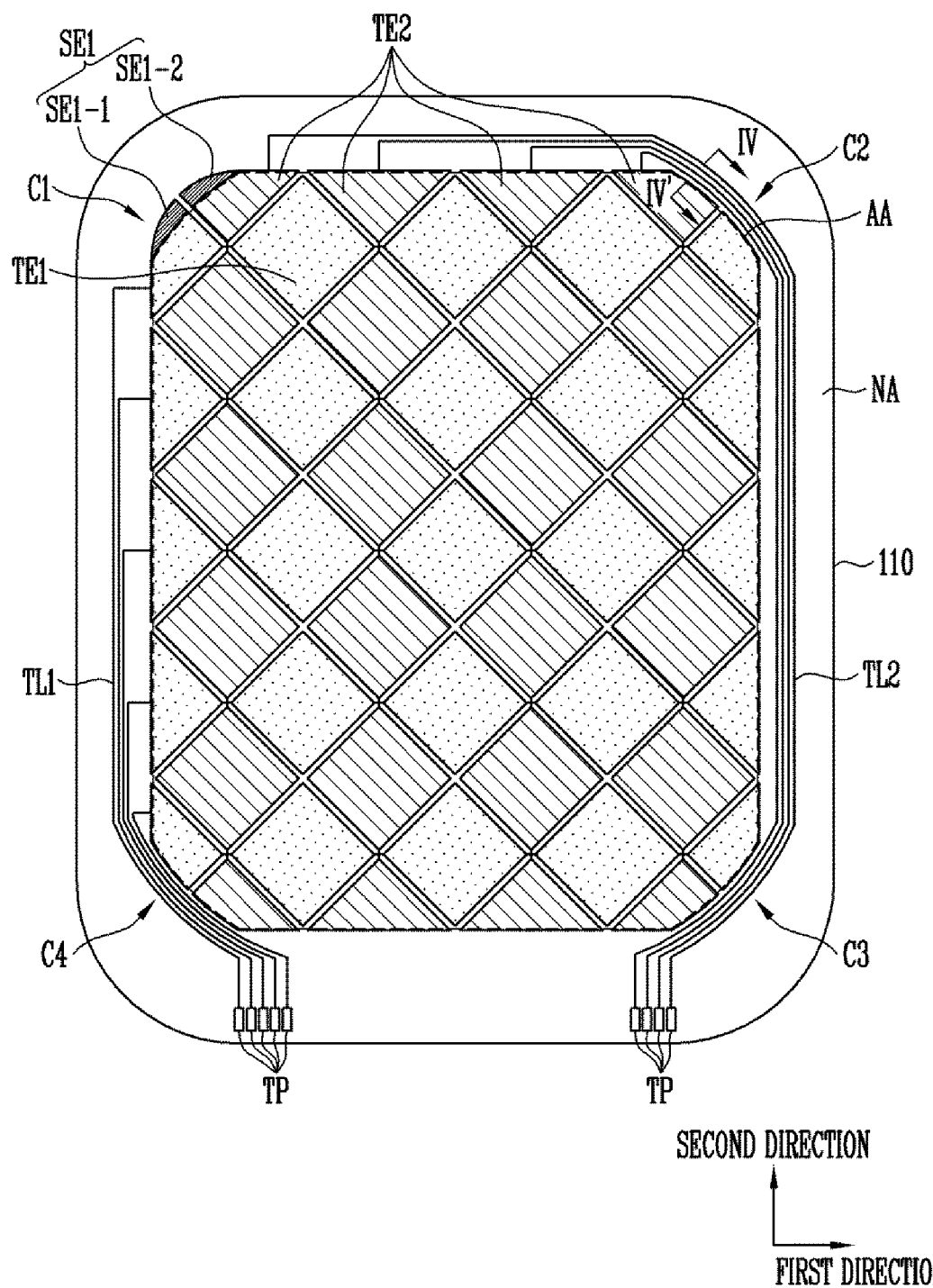
FIG. 5 is a plan view of a display device in accordance with still another exemplary embodiment of the inventive concepts.
Figure 6:
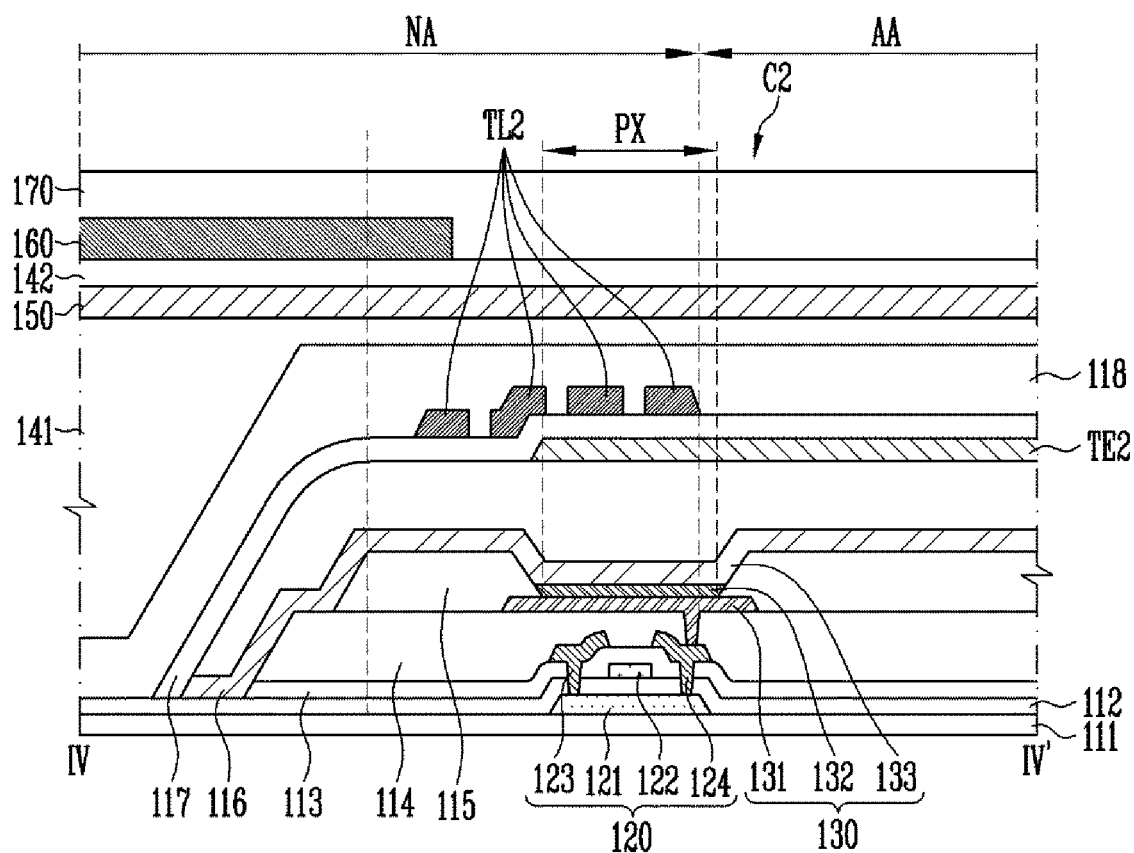
FIG. 6 is a sectional view taken along line VI-VI' shown in FIG. 5.

FIG. 5 is a plan view of a display device in accordance with still another embodiment of the inventive concepts. FIG. 6 is a sectional view taken along line VI-VI' shown in FIG. 5. The display device 300 shown in FIG. 5 and FIG. 6 is substantially identical to the display device 100 shown in FIG. 1, FIG. 2, and FIG. 3, except that a first screen electrode SE1 and touch lines TL1 and TL2 are differently disposed, and therefore, overlapping descriptions will be omitted.

Referring to FIGS. 5 and 6, the display region AA includes first to fourth corners C1 to C4. A first screen electrode SE1 is disposed at the first corner C1 of the display region AA. The first screen electrode SE1 disposed at the first corner C1 is substantially identical to the first screen electrode SE1 shown in FIG. 1, FIG. 2, and FIG. 3, and therefore, overlapping descriptions will be omitted.

A plurality of second touch lines TL2 are disposed at the second and third corners C2 and C3 of the display region AA. The plurality of second touch lines TL2 are respectively connected to the plurality of second touch electrodes TE2, and extend onto a plurality of pixels PX arranged in a stair step shape while being adjacent to the second corner C2. Accordingly, the second touch lines TL2 disposed along the second corner C2 can overlap with the pixels PX arranged in the stair step shape while being adjacent to the second corner C2 that is a rounded corner. As shown in FIG. 6, the second touch lines TL2 may be disposed on the touch insulating layer 117, and overlap with pixels PX disposed at an edge adjacent to the second corner C2. Accordingly, the second touch lines TL2 can prevent or reduce the pixels PX arranged in the stair step shape while being adjacent to the second corner C2 from being viewed from the outside.

In addition, the separation distance between adjacent second touch lines TL2 may be set to a distance at which light emitted from pixels PX disposed on the bottom of the second touch lines TL2 is not viewed from the outside. For example, the separation distance between the second touch lines TL2 may be 5 µm or less. When the separation distance between the second touch lines TL2 is greater than 5 µm, light emitted from the pixels PX disposed on the bottom of the second touch lines TL2 may be viewed by a user of the display device 300 through a space between the second touch lines TL2. Thus, the second touch lines TL2 are disposed at a separation distance of 5 µm or less, so that the pixels PX arranged in the stair step shape while being disposed on the bottom of the second touch lines TL2 can be prevented or reduced from being viewed from the outside.

The plurality of second touch lines TL2 extend onto a plurality of pixels PX arranged in a stair step shape while being adjacent to the third corner C3. Thus, the second touch lines TL2 disposed along the third corner C3 that is a rounded corner overlap with the pixels PX arranged in the stair step shape while being adjacent to the third corner C3. Accordingly, the plurality of second touch lines TL2 can prevent or reduce the pixels PX arranged in the stair step shape while being disposed adjacent to the third corner C3 from being viewed from the outside.

In addition, the separation distance between adjacent second touch lines TL2 may be set to a distance at which light emitted from pixels PX disposed on the bottom of the second touch lines TL2 is not viewed from the outside. For example, the separation distance between the second touch lines TL2 may be 5 μm or less.

The plurality of the second touch lines TL may be connected to a plurality of touch pads TP.

A plurality of first touch lines TL1 are disposed at the fourth corner C4 of the display region AA. The plurality of first touch lines TL1 are respectively connected to the plurality of first touch electrodes TE1, and extend onto a plurality of pixels PX arranged in a stair step shape while being adjacent to the fourth corner C4. Thus, the first touch lines TL1 disposed along the fourth corner C4 that is a rounded corner overlap with the pixels PX arranged in the stair step shape while being adjacent to the fourth corner C4. Accordingly, the plurality of first touch lines TL1 can prevent or reduce the pixels arranged in the stair step shape while being disposed adjacent to the fourth corner C4 from being viewed from the outside.

In addition, the separation distance between adjacent first touch lines TL1 may be set to a distance at which light emitted from pixels PX disposed on the bottom of the first touch lines TL1 is not viewed from the outside. For example, the separation distance between the first touch lines TL1 may be 5 μm or less. Thus, the first touch lines TL1 are disposed at a separation distance of 5 μm or less, so that the pixels PX arranged in the stair step shape while being disposed on the bottom of the first touch lines TL1 can be prevented or reduced from being viewed from the outside.

In the display device 300 in accordance with the still another embodiment of the inventive concepts, the touch lines TL1 and TL2 may be disposed on the pixels PX arranged in the stair step shape while being adjacent to the rounded corners of the display region AA. The separation distance between the touch lines TL1 and TL2 may be set to a distance at which the pixels disposed on the bottom of the touch lines TL1 and TL2 are not viewed through fine gaps between the touch lines TL1 and TL2. Thus, the touch lines TL1 and TL2 are disposed on the pixels PX arranged in the stair step shape while extending along the rounded corners, so that the pixels PX arranged in the stair step shape can be prevented or reduce from being viewed from the outside.

In the display device in accordance with the inventive concepts, the sensitivity of touch electrodes is improved, and pixels arranged in a stair step shape at a rounded corner of the display region are prevented or reduced from being viewed from the outside.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel including a display region including a rounded corner, the display region having a plurality of pixels arranged therein, and a non-display region surrounding the display region;
    a plurality of touch electrodes overlapping with the display region, the plurality of touch electrodes including a plurality of first touch electrodes that are disposed in a first direction and are electrically connected to each other and a plurality of second touch electrodes that are disposed in a second direction perpendicular to the first direction and are electrically connected to each other; and
    a first screen electrode disposed along the rounded corner to overlap with pixels disposed adjacent to the rounded corner among the plurality of pixels, the first screen electrode being electrically connected to some of the plurality of touch electrodes,
    wherein the first screen electrode overlaps with touch electrodes adjacent to the rounded corner with an insulating layer interposed therebetween, and is electrically connected to the touch electrodes adjacent to the rounded corner through a contact hole formed in the insulating layer.

2. The display device of claim 1, wherein pixels disposed adjacent to the rounded corner are arranged in a stair step shape, and
    wherein the first screen electrode overlaps with the pixels arranged in the stair step shape.

3. The display device of claim 1, wherein the first screen electrode includes:
    a first one of the first screen electrode electrically connected to a first touch electrode adjacent to the rounded corner among the plurality of first touch electrodes; and
    a second one of the first screen electrode electrically connected to a second touch electrode adjacent to the rounded corner among the plurality of second touch electrodes.

4. The display device of claim 1, further comprising a second screen electrode disposed along an edge of the display region, the second screen electrode overlapping with pixels disposed at an outer portion adjacent to the edge among the plurality of pixels, the second screen electrode being electrically connected to some of the plurality of touch electrodes.

5. The display device of claim 4, wherein the second screen electrode includes:
    a first one of the second screen electrode electrically connected to a first touch electrode adjacent to the edge among the plurality of first touch electrodes; and
    a second one of the second screen electrode electrically connected to a second touch electrode adjacent to the edge among the plurality of second touch electrodes.

6. The display device of claim 4, wherein the second screen electrode overlaps with touch electrodes adjacent to the edge with an insulating layer interposed therebetween, and is electrically connected to the touch electrodes adjacent to the edge through a contact hole formed in the insulating layer.

7. The display device of claim 4, wherein the second screen electrode is made of the same material as the first screen electrode.

8. The display device of claim 1, further comprising a plurality of touch lines disposed in the non-display region along an outer portion of the display region, the plurality of touch lines being respectively connected to the plurality of touch electrodes.

9. The display device of claim 8, wherein the first screen electrode is disposed between the plurality of touch lines and the rounded corner of the display region.

10. The display device of claim 8, wherein the first screen electrode is made of the same material as the plurality of touch lines.

11. The display device of claim 8, wherein the plurality of touch lines are disposed to extend to the display region along the rounded corner, and overlap with pixels disposed at an outer portion adjacent to the rounded corner among the plurality of pixels.

12. The display device of claim 11, wherein a distance between the plurality of touch lines disposed in the display region adjacent to the rounded corner is 5 µm or less.

13. The display device of claim 11, wherein the plurality of touch lines are disposed to extend to the display region along an edge of the display region, and overlap with pixels disposed at an outer portion adjacent to the edge among the plurality of pixels.

14. A display device comprising:
a display panel including a display region including a rounded corner, the display region having a plurality of pixels arranged therein, and a non-display region surrounding the display region;
a plurality of touch electrodes overlapping with the display region, the plurality of touch electrodes including a plurality of first touch electrodes that are disposed in a first direction and are electrically connected to each other and a plurality of second touch electrodes that are disposed in a second direction perpendicular to the first direction and are electrically connected to each other;
a first screen electrode disposed along the rounded corner to overlap with pixels disposed adjacent to the rounded corner among the plurality of pixels, the first screen electrode being electrically connected to some of the plurality of touch electrodes; and
a plurality of touch lines disposed in the non-display region along an outer portion of the display region, the plurality of touch lines being respectively connected to the plurality of touch electrodes,
wherein the plurality of touch lines are disposed to extend to the display region along the rounded corner, and overlap with pixels disposed at an outer portion adjacent to the rounded corner among the plurality of pixels.

15. The display device of claim 14, wherein a distance between the plurality of touch lines disposed in the display region adjacent to the rounded corner is 5 µm or less.

16. The display device of claim 14, wherein the plurality of touch lines are disposed to extend to the display region along an edge of the display region, and overlap with pixels disposed at an outer portion adjacent to the edge among the plurality of pixels.

* * * * *